W. E. WALLER AND F. P. STONE.
WHEEL.
APPLICATION FILED DEC. 17, 1913. RENEWED FEB. 25, 1919.
1,317,246. Patented Sept. 30, 1919.
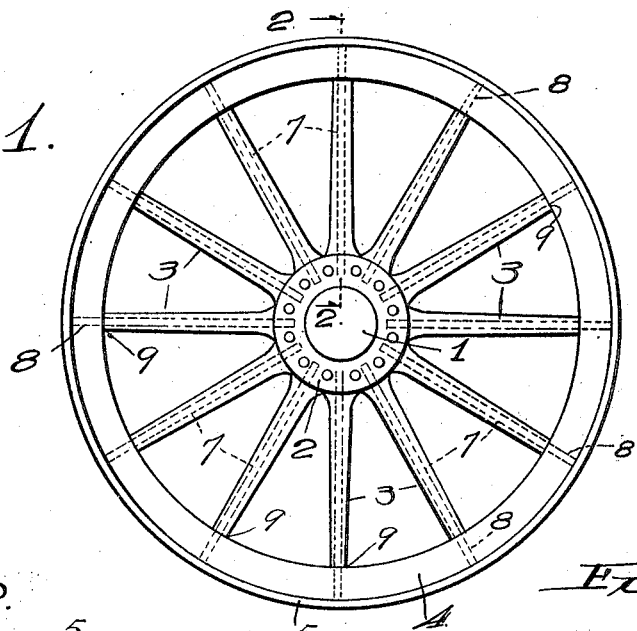
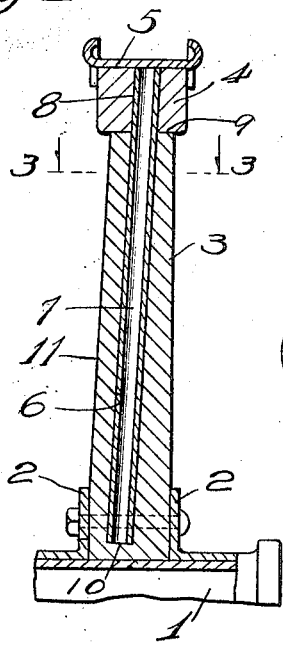
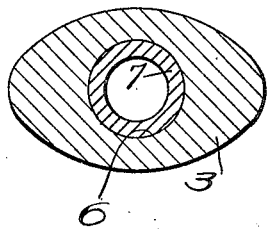
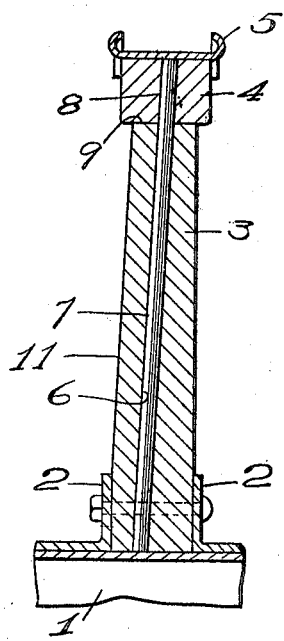
Witnesses:
Inventors:
Warren E. Waller and
Frank P. Stone,
by Parker & Carter
their Attys

UNITED STATES PATENT OFFICE.

WARREN E. WALLER, OF CHARLES CITY, AND FRANK P. STONE, OF CHICAGO, ILLINOIS; SAID WALLER ASSIGNOR TO SAID STONE.

WHEEL.

1,317,246.        Specification of Letters Patent.      Patented Sept. 30, 1919.

Application filed December 17, 1913, Serial No. 807,182. Renewed February 25, 1919. Serial No. 279,181.

*To all whom it may concern:*

Be it known that we, WARREN E. WALLER and FRANK P. STONE, citizens of the United States, residing, respectively, at Charles City, in the county of Floyd and State of Illinois, and Chicago, county of Cook, and State of Illinois, have invented a certain new and useful Improvement in Wheels, of which the following is a specification.

This invention relates to wheels and has for its object to provide a new and improved device of this description.

The invention is illustrated in the accompanying drawings, wherein;

Figure 1 is a view of one form of wheel embodying the invention;

Fig. 2 is a sectional view taken on line 2—2 of Fig. 1;

Fig. 3 is a sectional view taken on line 3—3 of Fig. 2;

Fig. 4 is a longitudinal sectional view through a spoke showing a modified construction.

Like numerals refer to like parts throughout the several figures.

We have illustrated the invention in connection with an automobile wheel, but it is of course evident that it may be used in connection with other wheels if desired and also with other forms of automobile wheels than that herein illustrated.

Referring now to the drawings we have shown a wheel provided with the axle box 1, the hub plates 2, the spokes 3 and felly 4 and the metal rim 5, the tire shown being of the form for attaching a pneumatic tire. As illustrated, the spokes 3 are provided with radial holes or openings 6, said openings containing strengthing pieces 7, preferably of metal. The outer ends of the strengthening pieces 7 preferably engage the rim 5. In Figs. 1 to 3 these strengthening pieces are shown as tubes and in Fig. 4 as rods. The spokes are made of wood and the strengthening pieces 7 project from the ends thereof so as to form the tenons 8 which project into the felly 4. The upper end 9 of the spoke acts as a shoulder and engages the felly 4. It will be seen that by means of this construction the tenons 8 can be made smaller than if made of wood and still have equal or greater strength, thus permitting a small hole to be made in the felly 4, which is of wood, thus weakening said felly less than if the larger wooden tenon is used. The radial hole or opening 6 stops at 10 and the strengthening piece 7 rests on the bottom thereof. The strengthening piece 7 must have a portion thereof opposite the hub plates 2 so that the lateral strains will be taken up by the said strengthening pieces. If other forms of hubs are used, the strengthening pieces must run down part way into the hub so as to secure the same result. In Fig. 4 we have shown a construction where the strengthening piece 7 in the spoke 3 is a solid rod. By making this strengthening piece hollow, that is, a tube, greater strength can be secured with the same weight of metal. The wheels upon vehicles are subjected to severe lateral strains. The wheels are on the axle and when the vehicles turn suddenly or the wheel strikes a curb or drops into a rut, the axle carrying the weight of the vehicle acts as a battering ram tending to push the center of the wheel outwardly and unless this force is properly resisted the wheel is broken down. The strengthening pieces must be so arranged as to take these lateral or shearing stresses and resist them so as to prevent the breaking down of the wheel. In order that this result may be secured, the strengthening pieces must be of such length and have their outer and inner ends arranged so that this lateral stress may be properly applied to them. The inner end of the strengthening piece should also be stopped a sufficient distance from the inner end of the spoke or otherwise arranged to secure a substantial support at the base. We prefer to have the inner side of each spoke tapered from the hub to the felly, as shown at 11. The strengthening pieces in the spokes are preferably substantially parallel with the tapered side of the spoke so that they also form a dish. In Fig. 4 we have shown the end of the strengthening piece engaging the metal axle box 1 and the rim 5. It will be seen that when the strengthening piece is dished, additional strength is given the wheel because any lateral force tending to break the wheel is resisted by not only the strength of the spoke and the strengthening piece, but by the dish of the spoke and the dish of the strengthening piece. Since the strengthening piece abuts at both ends against the resisting parts, it will be seen that this dished effect is of very great advantage in strengthening the wheel.

We claim:

1. A wheel comprising a metal axle box, a felly, an outer rim, a series of wooden spokes, strengthening pieces extending lengthwise through said spokes and inclined with relation to the axis of said wheel so as to form a dish, said strengthening pieces engaging said rim and said metal axle box, whereby the movement of said strengthening pieces toward a position perpendicular to the axis of said wheel is resisted by said rim and axle box.

2. A wheel comprising a hub, a felly, an outer rim, a series of wooden spokes connecting the hub and the felly, said spokes each having one side substantially perpendicular to the axis of the wheel and the other side inclined with relation to the axis of the wheel, metal strengthening pieces extending lengthwise through said spokes, each strengthening piece being substantially parallel with the inclined face of the spoke in which it is contained, whereby a dish is given to the strengthening pieces when used in an undished wheel.

3. The combination with an undished wheel having a hub, a series of spokes and a felly, of a series of metal strengthening pieces extending lengthwise in said spokes and inclined with relation to the axis of the wheel, and resisting parts at the ends of said metal strengthening pieces adapted to resist their being moved to a position perpendicular to the axis of the wheel when lateral pressure is applied to the hub of the wheel, whereby a dished effect is secured in an undished wheel.

In testimony whereof, we affix our signatures in the presence of two witnesses.

WARREN E. WALLER.
FRANK P. STONE.

Witnesses:
GENEVA HERTH,
BESS MAWHINEY.

Copies of this patent may be obtained for five cents each, by addressing the "Commissioner of Patents, Washington, D. C."